(12) United States Patent
Schepman et al.

(10) Patent No.: US 9,520,070 B2
(45) Date of Patent: Dec. 13, 2016

(54) INTERACTIVE LEARNING SYSTEM AND METHOD

(71) Applicants: Clay Reid Schepman, Brownstown, IN (US); Ryan Andrew Culbreth, Seymour, IN (US)

(72) Inventors: Clay Reid Schepman, Brownstown, IN (US); Ryan Andrew Culbreth, Seymour, IN (US)

( * ) Notice: Subject to any disclaimer, the term of this patent is extended or adjusted under 35 U.S.C. 154(b) by 174 days.

(21) Appl. No.: 14/184,942

(22) Filed: Feb. 20, 2014

(65) Prior Publication Data

US 2014/0234824 A1 Aug. 21, 2014

Related U.S. Application Data

(60) Provisional application No. 61/767,140, filed on Feb. 20, 2013.

(51) Int. Cl.
*G09B 3/00* (2006.01)
*G09B 7/02* (2006.01)

(52) U.S. Cl.
CPC ....................... *G09B 7/02* (2013.01)

(58) Field of Classification Search
USPC ................. 434/322, 323, 350, 365
See application file for complete search history.

(56) References Cited

U.S. PATENT DOCUMENTS 8,294,016 B2 10/2012 Franzblau
2003/0162152 A1* 8/2003 Lee ..................... G09B 11/00
434/162

* cited by examiner

*Primary Examiner* — Kesha Frisby
(74) *Attorney, Agent, or Firm* — John Roberts; Roberts IP Law

(57) ABSTRACT

Disclosed is an interactive learning system and method comprising a plurality of student computing devices and database(s) connected through a network with teacher computing device(s), each adapted to help teachers and students engage in real-time qualitative content engagement, and may also provide real-time quantitative content engagement and analytics, to help determine the appropriate next learning steps of individual students and groups of students in real-time. In various example embodiments the system and method may provide actionable feedback and suggestions for students, for instance to help them understand the quality of their work and areas for further investigation. In various example embodiments the system and method may generate layers of data useful for improving subsequent classes directed to the same material, and for measuring and comparing various indicia, such as performance and trends at the student, teacher, school, district, and state levels, as well as identifying correlations and other statistical relationships.

19 Claims, 7 Drawing Sheets

Example Teacher View Screen

Example Functions of an Example System and Method

Example of Teacher Planning Using A Database

Example of Teacher Assessment

Example Teacher View Screen

Example Teacher View Screen

At my school we are getting ready to start the second full
week of school. I teach U.S. History, and next week we are going to
begin studying the different Native American groups of the United
States. I am going to use the Metaphor strategy this next week to
discuss Native Americans, were they lived, and how their climate
dictated their culture.
    One learning objective that I have for this lesson is for my
students to identify Native American tribes in different parts of the
country. Another objective is for my students to understand that
the geographical and climate areas in which Native Americans lived
had a large impact on their clothing, food, shelter, and religion.
These are all parts of their culture, and the cultures of the different
tribes in America varied greatly due to the different climate and
geographical zones.
The third and final objective of this lesson is for my students to
grasp that although there were tribes all across North America
these tribes were independent. This is important because it has to
do with how easily the European and later the Americans were able
to defeat the Native Americans. Had the Indians had large unified
civilizations it would have been much harder for outside nations to
defeat them.

Question
Inference
Prediction
Comment

I wonder what a
Metaphor is?

FIG. 6
Example of Student Screen

Scrolling Highlighting of Text Reaches Word "Metaphor"
Student Hits Key To Stop Scrolling
Student Clicks On "Question" and Asks What A Metaphor Is
Teacher Sees This And Can Send an Answer In Real-Time

INTERACTIVE LEARNING SYSTEM AND METHOD

CROSS-REFERENCE TO RELATED APPLICATIONS

This application claims priority to and incorporates herein by reference all of U.S. Provisional Patent Application Ser. No. 61/767,140 to Schepman and Culbreth, filed Feb. 20, 2013 and entitled Interactive Reading Comprehension System and Method.

FEDERALLY SPONSORED RESEARCH OR DEVELOPMENT

None.

TECHNICAL FIELD

The present invention relates generally to a computer-implemented interactive learning system and method.

BACKGROUND

Students are often viewed in terms of summative assessment and proficiency, that is, measuring their proficiency at the end of an instructional unit and comparing it to a benchmark, for instance using a standardized test after the material has been taught. Summative assessment seeks to monitor educational outcomes, often for purposes of external accountability. In practice this is often tantamount to sending numerous individuals separately on long journeys to a distant destination and not checking whether any of them are heading in the right direction until the day they are supposed to arrive at the destination. Only at the end of such a process does one discover that some travelers are off-track, heading in the wrong direction, or lost. Summative assessment, such as state-mandated tests, exams, quizzes, and even homework simply do not contribute to classroom instruction that helps determine in real-time the next learning steps of individual students.

Formative assessment is in theory an improvement on summative assessment. Formative assessment may include a range of formal and informal assessment procedures employed by teachers during the learning process to modify teaching and learning activities to improve student attainment. It typically involves qualitative feedback (rather than scores) for both student and teacher that focuses on the details of content and performance; in other words gathering feedback from students to guide improvement in the ongoing teaching and learning experience. Teachers attempt to apply formative techniques by reviewing assignments before tests, and utilizing pop quizzes, worksheets, journals, and the like, but teachers typically review these later, not in real-time. In practice, these techniques fail to approach the ideal of truly formative assessment, due in large part to ineffective, incomplete, and untimely communication between teachers and students.

What is needed is a tool to help teachers and students achieve the full potential of formative assessment by facilitating real-time content engagement that helps determine in real-time the appropriate next learning steps of students.

SUMMARY

The present invention elegantly addresses all the above challenges and provides numerous additional benefits. In various example embodiments the solution discovered by the present inventors may comprise a system and method that helps teachers and students engage in real-time qualitative content engagement, and may also provide real-time quantitative content engagement and analytics, to help determine the appropriate next learning steps of individual students and groups of students in real-time. In various example embodiments the system and method may provide actionable feedback and suggestions for students, for instance to help them understand the quality of their work and areas for further investigation. In various example embodiments the system and method may generate layers of data useful for improving subsequent classes directed to the same material, and for measuring and comparing various indicia, such as performance and trends at the student, teacher, school, district, and state levels, as well as identifying correlations and other statistical relationships.

One application of the present system and method relates to learning the skill of reading. A major topic of discussion in current educational systems is literacy. More specifically, there are concerns about the levels of literacy in content areas, such as science and social studies. It was reported by the National Assessment of Educational Progress (NAEP, also called the Nation's Report Card) that in 2011, only 32% of eighth graders in the state of Indiana were at or above the proficient level in reading. Couple this low percentage with the advent of Common Core or similar standards and their reliance on more rigorous texts and college readiness, and this presents a deepening gulf between the people who can read and those who cannot.

The Common Core Standards, for example, do not directly change any of the content area state standards. What they do to subjects like science, social studies, math, and technical subjects is simply add ten literacy standards and expect these teachers to include these literacy practices within their classrooms. But there is resistance and confusion among teachers of other subjects with respect to teaching reading, because literacy is its own distinct subject that other teachers may not be fully prepared to teach.

The present system and method can provide teachers of any subject matter an opportunity to view, analyze, and assess student reading in real time. The present system and method can allow educators in all disciplines a glimpse of what is happening inside of students' minds while they are reading. The general concept of interacting with texts while reading is not new, but the present system and method system provides a way for educators to automatically see these interactions as they occur in real time.

Before looking at examples of how the present system and method can empower all teachers with the ability to include literacy skills and strategies in their classrooms, it is helpful to understand that teaching literacy is teaching reading skills. Content area teachers teach specific content. The skills that a language arts teacher needs to address are primarily a reasonably finite set. Using the Indiana Academic Standards Teacher's Edition as a guide, a simplified list of literacy skills by grade level may comprise the following:

First Grade: confirm predictions about what will happen next in a text by identifying key words; relate prior knowledge to what is read.

Second Grade: restate facts and details in the text to clarify and organize ideas.

Third Grade: ask questions and support answers by connecting prior knowledge with literal information from the text; show understanding by identifying answers in the text.

Fourth Grade: make and confirm predictions about text by using prior knowledge and ideas presented in the text itself.

Fifth Grade: draw inferences, conclusions, or generalizations about text and support them with textual evidence and prior knowledge. (note that this is an after-reading activity).

After fourth grade, the above guide actually states: "Focus on Informational Materials" directly under the Reading Comprehension heading. From fifth grade forward, students are expected to perform tasks such as "Assess the adequacy, accuracy, and appropriateness of the author's evidence to support claims and assertions, noting instances of bias and stereotyping." Such standards implicitly presume that reading skills such as predicting, connecting, asking questions, finding answers, visualizing texts, and simply commenting while reading will be mastered by the fourth grade. But in reality they very often are not.

Typically, elementary school teachers spend a lot of time focusing on basic skills like phonemic awareness and word groups. Once students have mastered such basic skills and can read aloud every word on a page, then those students are typically presumed to be trained in reading. But the present system and method reveals that this presumption is only partly true. There is another factor that needs to be considered if students are going to actually be able to read with comprehension. The extra factor is how well the student interacts with any given text in order to extrapolate meaning from it.

This is a skill that proficient readers perform without even thinking about it. But unfortunately, skills as basic as re-reading for comprehension are often lost on many students. Students often do not think about the questions that they have while reading. Some students don't even ask any questions while reading in an attempt to understand a text. There is a psychological term called automaticity in which someone can do things without burdening their mind with more basic level details. For example, a proficient reader need not spend a lot of brain power simply decoding, or applying known letter sounds to be able to pronounce written words. Accordingly, an accomplished reader can use his or her brain power or concentration for higher-level thinking. According to the present version of the online Wikipedia page regarding automaticity (http://en.wikipedia.org/wiki/Automaticity), a skilled reader performs multiple tasks at the same time, such as decoding the words, comprehending the information, relating the information to prior knowledge of the subject matter, making inferences, and evaluating the information's usefulness to a report he or she is writing. This same Wikipedia page indicates that automaticity should be focused-on in early years to ensure higher level reading skills in adolescence.

The present system and method can provide educators with real-time exposure to students' thinking as they are moving toward automaticity and becoming accomplished readers, by allowing teachers to actually see when one or more of a plurality of students has questions or understands a concept well enough to relate it to prior knowledge. In the past, these are things that teachers simply hoped were happening. Or worse, these are things that teachers would quiz students over in class, often twenty-four hours or more after a student has read a text. The present system and method provides embedded assessment that can show teachers which students in which classes are struggling and where in the text these struggles occur, all potentially in real-time. In the past, assessment practices have entailed waiting until the students have read the text and asking them where they had difficulty. This is a challenging task for anyone, but especially someone who had difficulty reading the text in the first place. The present system and method can allow teachers the opportunity to help students with metacognition, or thinking about their thinking. For example, the present system and method can allow teachers to embed questions or tasks within any digital text and watch all the students' progress in real-time as they work through those tasks. Simultaneously, the present system and method helps students practice the literacy skills that they will need to comprehend higher-level texts.

Specifically with respect to language arts teachers, the present system and method can be a major time saver. Best practices in adolescent literacy instruction, as noted previously, demand that some skills be taught explicitly with plenty of opportunities for practice to reinforce those skills. The skills include those interactions that accomplished readers perform without conscious awareness. In the past, teachers could request that students write their ideas or interactions on sticky notes, in journals, or some other place. For example, a teacher might ask students to write an interaction (or multiple interactions) on a sticky note at the end of a reading interval, such as at the end of each chapter in a novel. If that novel has twenty chapters, and the teacher has one-hundred students, then that teacher would have to manually sort through and review two-thousand sticky notes. Another variance on this strategy is having students record multiple interactions in a journal-type setting. The same scenario occurs. The students finish the book and the teacher is bombarded with interactions and no possible frames of reference to assess whether the student actually had those interactions while reading the corresponding portions of the text. For example, students might copy from other students, wait until the end and fill out the assignment, or talk to other students and get ideas for possible interaction entries.

The present system and method can record all interactions that students are having in real time. That means as soon as a question or comment pops into a student's head, he or she can push a button, key, or area on a screen (or use voice-activated command) and record that question or comment immediately, and automatically associate it with the segment of text then being displayed on a digital device (or the segment of text then being read aloud by a digital device). The teacher can see exactly where each student stopped reading and recorded the question. If the teacher notices that many students are stopping at a particular spot in a text and asking a specific question, then that teacher will certainly be able to tailor his or her next lesson to include addressing the students' questions. The same is true for interactions, connections, visualizations, inferences, comparing and contrasting, analyzing author's intent, and any other suitable literacy skills.

A potentially even more helpful feature of the present system and method is that all interactions may be collected into a database that stores all interactions on all texts used. Therefore, a teacher who knows that a prior year's students really struggled with a certain section of a text could frontload instruction in a way that removes that particular trouble spot. With enough data collected through different class periods, academic teams, schools, school corporations, and states, all over a number of years, for example, teachers can easily see where students will struggle with a particular text and be prepared to meet those challenges before a student even has the opportunity to fail. The present system and method will allow content area teachers to see how students attack a document, such as the Declaration of Independence, and how they attempt to make sense of what they read. The same holds true for science and technical subject texts, as well, all of which provides a great improvement over present teaching methods.

The present system and method can provide special advantages for English as a Second Language (ESL) classrooms, early childhood classrooms, and other language arts classrooms. For example, multiple-choice questions can be formatted into any form, such as short answer or short essay, true/false, matching, and automatically presented to students as they read a digital text. There can also be an option for the teacher or student to highlight predetermined vocabulary terms in the text, such as content-specific terminology. For example, when a student scrolls to, turns to, or otherwise arrives at a specific vocabulary word, then a pop up box may appear on the student's screen that contains that word, and the student must input the definition. The student could either have to type (or say, if the student has a microphone) the definition or the teacher could program a multiple choice or matching style question instead. For ESL and/or early childhood classrooms, there can be an option to have pictures presented to the student instead of written choices for vocabulary terms. This is shown to help ESL students learn vocabulary. If an ESL student happens to miss the question or choose the wrong picture, then those responses can be hyperlinked to an explanation written in the student's primary language that can help the student understand why their selection was incorrect.

Another option that teachers could employ would be to embed hyperlinks at certain points in a text so when students arrive at a specified location within a document, a hyperlink could take them to a website or other electronic document with supplemental information, such as a museum tour or a WebQuest (i.e., an inquiry-oriented lesson format in which most or all the information that learners work with comes from the web).

Another option for language arts or English classes specifically would be to have embedded grammar checks in which teachers can purposely make a sentence incorrect and ask the student "How could this sentence be written better?" or something similar. The student could have a multiple choice option or short answer. This option could also include the skill of summarizing paragraphs or sections. Standardized tests use these two types of questions frequently when assessing students' ability to use Standard English conventions or to assess students' ability to summarize texts.

The present system and method can provide virtually unlimited options for automated data collection and customized reporting. Various example reports that the present system and method can produce may include an individual report for each student's answers on embedded questions. There may also be a document or text report that shows all students' answers in a class, grade, school, etc., for instance at specific places in a text. The number and types of reports that may be created using data generated with the present system and method are virtually unlimited as will be apparent to persons of skill in the art upon reviewing this disclosure.

For example, in various example embodiments students might utilize a highlight option that highlights or otherwise presents the text for reading at a predetermined or adjustable rate. In these embodiments the reading rate of each student may be recorded and reported. If a student is not utilizing such a highlighting option, then total time for completion of the text may be recorded and reported.

In various example embodiments there may be a cumulative reporting option that will record and report all interactions that a specific student has made. There may also be a rate of interaction option that would show how often a student records interactions. There may also be a frequency of interaction report in which each specific type of interaction and how often a student utilizes each specific type would be recorded and reported.

In various example embodiments all data may be collected and stored in one or more databases so as to be fully searchable by student identification number or any other suitable means. The database of interactions and other information may be fully or partially searchable based on any number of parameters. Some possible search parameters or categories and/or sub-categories may include: class period; per week/month/grading period/school year or any other suitable period or length of time; per book/document or other digital text or any subpart thereof; age; gender; reading or other scholastic level or ability; race; ethnicity; free/reduced lunch status; Individualized Education Plan (IEP) status; teacher; school; school district; state or other geographical or political subdivision; or any other parameter for which data may be available.

Students can select any word on a document and have that word defined, similar to what Microsoft Word can do. There is an option for teachers to be able to use their own definition instead of the prescribed definition. All words that students need help defining will be recorded and stored within the database. These words will carry over between classes, grading periods, or school years. These words will also be linked to the text from which they are found. Teachers will be able to see which words are most problematic with and student text within the classes or over the years. This will greatly help content area teachers pre-teach vocabulary, which is a critical teaching strategy in content area subjects.

The present system and method can provide special advantages for standardized testing and accountability. As mentioned earlier, one example aspect of the present system and method may be embedded assessment. One example of this is when a student is reading and a box or window pops up, and inside the box is a question in any type of format that the teacher chooses to put in that box. The student answers the question or otherwise responds in the format that the teacher has programmed for that inquiry. This interrogatory system can be used for or in connection with standardized tests such as ISTEP (Indiana Statewide Testing for Educational Progress), PARCC (Partnership for Assessment of Readiness for College and Careers), or any other standardized test provided via electronic means.

Currently with tests such as the ISTEP, a student reads a text and then answers multiple questions at the end of the text. The questions assess the students on multiple competencies. If standardized tests were to adopt various example aspects of the present system and method, the questions could be programmed to pop up at the exact section of the text when the interaction(s) should be happening and the specific skill should be being addressed. The student would not have to go back over the text and patch together what they had thought. Instead, the student would be evaluated on a chosen competency or skill within the flow of reading. Such an improved assessment would be gauging how a student comprehends the text while they are reading, and not simply recalling information later or forcing the student to go back through the text in order to hunt for answers. Hunting for answers is the only way some students even attempt to answer questions on a standardized test. This embedded format would remove that option altogether and more accurately present the student's thinking pattern with respect to the skill(s) being tested.

Another example aspect of the present system and method that could revolutionize standardized testing is the option that allows or requires students to input their rationale after answering a question. This way the assessment would provide much more than a simple right or wrong answer. Test graders would be able to ascertain why the student chose the answer that they did. This information is important for both correct and incorrect answers, as it is important for teaching to know why a student got a question wrong or right. This is where the advantages of the database can be amplified. Any or all of the data in the database can potentially be used to advance learning and address problem areas in standardized tests, making them much more effective and valuable.

Many states already require the tracking of student growth. If a state could see that students across the state are having problems answering questions regarding a certain competency, skill, or standard, then the Department of Education could communicate to the schools what those problem area are or where they are located. The present system and method takes that a step farther in certain example embodiments by collecting, recording, and reporting the rationales that the students are giving for why they are picking certain answers. This will allow state officials and teachers to see where the disconnect is between the teachers' teaching of a skill and the students' understanding of how to use that skill independently.

For example, in one potential example a high percentage of seventh graders in a specific state may have problems with a certain competency or skill, while one or two schools excelled at the same competency. Teachers in the school that was proficient could be asked to do a professional development webinar or to teach a strategy of instruction to other teachers. By using the present system and method, a standardized test could have identified not just who is good and bad at teaching a competency or skill, it could also provide valuable data identifying why students are proficient or not, and thereby indicate how to effectively address the problem.

This also has implications for teacher accountability. By using the rationale inputs and the database, specific strengths and weaknesses of individual teachers can be identified. If a teacher's students are struggling with a specific standard or skill, it will be possible to help identify the cause by using the student rationale data. The teachers that are struggling can now be given an improvement plan that will be based on proven techniques used by the teachers that have excelled. For example, a struggling teacher that has been identified as "needs improvement" could receive a digital folder with professional development videos and lesson plans from teachers that have been identified as effective. Then the struggling teacher would have specific ways to improve that are proven to work. If the struggling teacher still does not improve, then they may be further categorized. Likewise, the teachers that are contributing materials and recording professional development videos for the digital folders could receive recognition, merit pay, and/or be categorized as "highly effective."

To implement any or all of the above features as well as additional features that will be apparent to persons of skill in the art, provided in various example embodiments is an electronic interactive learning system that may comprise: a plurality of student computing devices comprising one or more processor units, one or more programmable memory units, data storage medium, one or more input ports, one or more output ports, and circuitry connecting to a network; one or more teacher computing devices comprising one or more processor units, one or more programmable memory units, data storage medium, one or more input ports, one or more output ports, and circuitry connecting to the network; one or more databases in electronic communication with the plurality of student computing devices through the network and in electronic communication with the one or more teacher computing devices through the network, the one or more databases containing digital content for student review, the digital content comprising a plurality of segments; each of the plurality of student computing devices adapted to: access the digital content and present the plurality of segments to a unique student at a predetermined pace; receive input from the unique student regarding one or more of the plurality of segments of the digital content; associate said input with said one or more of the plurality of the segments corresponding to said input; and communicate in real-time to the one or more teacher computing devices said input from the unique student and its association with said digital content; each of the one or more teacher computing devices adapted to: access and present to one or more teachers in real-time information identifying said input and the unique student with which said input is associated; and said one or more databases adapted to: update said digital content with said input from the unique student and its association with said digital content.

In various example embodiments an electronic interactive learning system may comprise said input from the unique student being selected from categories associated with at least one of said segments, said categories preselected by the one or more teachers. Said categories may be selected from the group consisting of: predictions, inferences, connections, questions. In various example embodiments each of the plurality of student computing devices may be further adapted to: present to the unique student one or more questions corresponding to one or more of the plurality of segments, wherein the one or more questions are generated by the one or more teachers; and wherein said input from the unique student comprises one or more answers to the one or more questions. Each of the plurality of student computing devices may be further adapted to: present to the unique student one or more follow-up questions after the unique student inputs the one or more answers to the one or more questions; wherein said input from the unique student comprises one or more answers to the one or more follow-up questions.

In various example embodiments an electronic interactive learning system may comprise said one or more teacher computing devices being adapted to access a plurality of said inputs from a plurality of said unique students and simultaneously present in real-time to the one or more teachers hyperlinks to said plurality of said inputs and information indicating the number of said inputs inputted by each of said unique students. In various example embodiments an electronic interactive learning system may comprise said one or more teacher computing devices being adapted to access a plurality of said inputs from a plurality of said unique students and simultaneously present in real-time to the one or more teachers at least a portion of the contents of said plurality of said inputs and information identifying each unique student corresponding to each of said plurality of said inputs.

In various example embodiments an electronic interactive learning system may comprise said one or more teacher computing devices being adapted to access a plurality of said inputs from a plurality of said unique students and simultaneously present in real-time to the one or more teachers hyperlinks to said plurality of said inputs and information indicating the number of said inputs inputted by each of said unique students in each of said categories.

In various example embodiments an electronic interactive learning system may comprise said one or more teacher computing devices being adapted to access a plurality of said inputs from a plurality of said unique students and simultaneously present in real-time to the one or more teachers information indicating a total number of said inputs inputted regarding each of said plurality of segments. Said one or more teacher computing devices may be further adapted to simultaneously present in real-time to the one or more teachers information indicating how many of each of said inputs are desired to be completed for each of said categories for each of said unique students.

In various example embodiments an electronic interactive learning system may comprise each of the plurality of student computing devices being further adapted to stop presenting additional segments to the unique student until the student computing device receives one or more inputs regarding one or more of the segments presented to the unique student. In various example embodiments an electronic interactive learning system may comprise each of the plurality of student computing devices being further adapted to stop presenting additional segments to the unique student while the student computing device receives the input.

In various example embodiments an electronic interactive learning system may comprise said one or more teacher computing devices being adapted to access a history of said inputs from any one of said unique students and present to the one or more teachers information regarding said history of inputs, said information comprising the content of said history of said inputs. In various example embodiments an electronic interactive learning system may comprise a first one of said one or more teacher computing devices being adapted to access from a second one of said one or more teacher computing devices a history of said inputs from a plurality of said unique students.

Also provided in various example embodiments is a method of interactive learning, which may comprise the steps of: causing a plurality of unique students to use a plurality of student computing devices to: access digital content comprising a plurality of segments and present the plurality of segments of the digital content to a unique student at a predetermined pace; receive inputs from the plurality of unique students regarding one or more of the plurality of segments of the digital content; associate said inputs with said one or more of the plurality of the segments corresponding to said inputs; and communicate in real-time to one or more teacher computing devices said inputs and their corresponding associations with said digital content; using one or more teacher computing devices to: access and present to one or more teachers in real-time information identifying said inputs and each unique student with which each of said inputs is associated; and causing one or more databases to: update said digital content with said inputs and their corresponding associations with said digital content; wherein the plurality of student computing devices comprises one or more processor units, one or more programmable memory units, data storage medium, one or more input ports, one or more output ports, and circuitry connecting to a network; wherein the one or more teacher computing devices comprises one or more processor units, one or more programmable memory units, data storage medium, one or more input ports, one or more output ports, and circuitry connecting to the network; and wherein the one or more databases are in electronic communication with the plurality of student computing devices through the network and in electronic communication with the one or more teacher computing devices through the network, and the one or more databases contain the digital content.

In various example embodiments a method of interactive learning may further comprise any or all of the steps of: communicating new information to the plurality of unique students based on the inputs; communicating new information to one of the unique students based on one or more inputs received from that student; communicating one or more new questions to the plurality of unique students based on the inputs; communicating one or more new questions to one of the unique students based on one or more inputs received from that student; and accessing the updated digital content on the database and evaluating the performance of one or more of the one or more teachers based on the updated digital content.

Further details regarding example embodiments of the invention are provided below with reference to the accompanying example figures. Additional aspects, alternatives and variations as would be apparent to persons of skill in the art are also disclosed herein and are specifically contemplated as included as part of the invention. Various specially-adapted computers, servers, networks and systems are provided to constitute the system and facilitate the system and method. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The accompanying figures, drawings, and photographs illustrate certain aspects of example embodiments of the invention.

FIG. 6 is a diagram of an example view of a student's interaction with an example interactive learning system and method according to one example embodiment.

DETAILED DESCRIPTION OF EXAMPLE EMBODIMENTS

Figure 1:
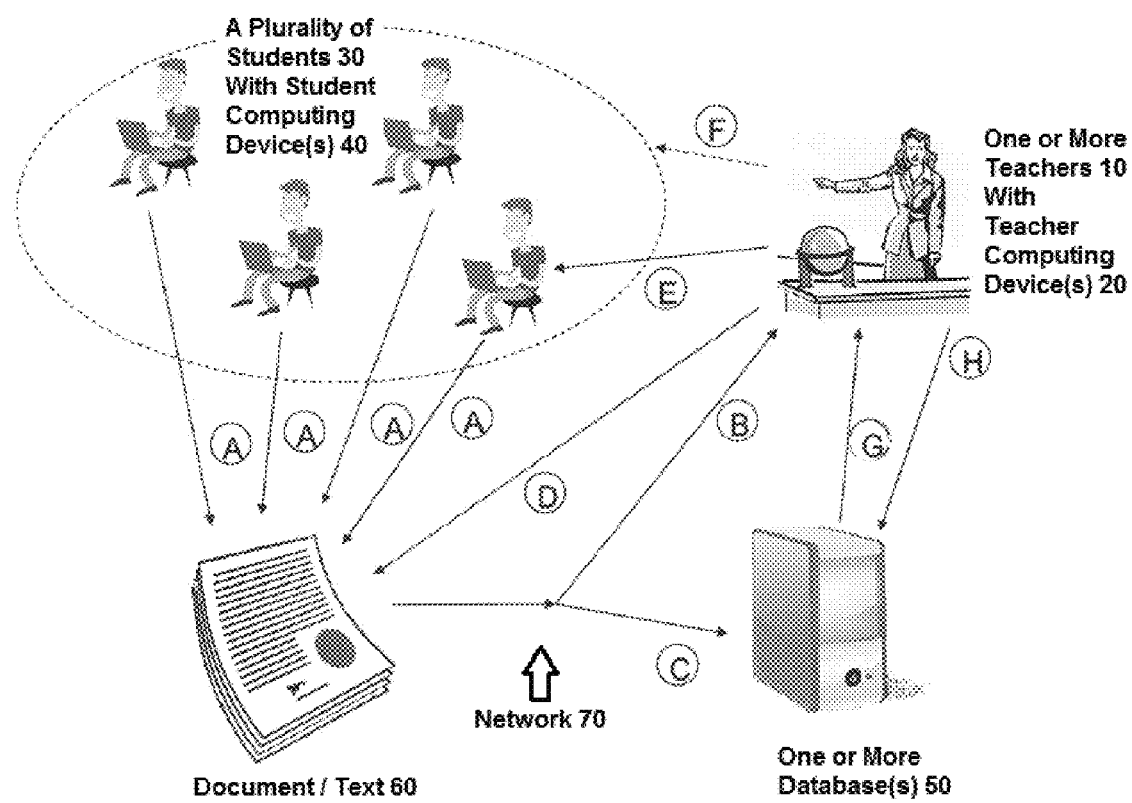
FIG. 1 is a diagram showing certain aspects of an example interactive learning system and method according to one example embodiment.

Reference will now be made in detail to some specific examples of the invention, including any best mode contemplated by the inventor for carrying out the invention. Examples of these specific embodiments are illustrated in the accompanying drawings. While the invention is described in conjunction with these specific embodiments, it will be understood that it is not intended to limit the invention to the described or illustrated embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. For example, U.S. Pat. No. 8,294,016 B2, issued Oct. 23, 2012 to Franzblau, is hereby incorporated herein by reference in its entireties as if fully reproduced herein. Additionally, the following references provide background information relating to pedagogical aspects of certain embodiments of the present system, and are incorporated herein by reference to the extent permissible:

Beers, G. K. (2003). When kids can't read, what teachers can do: A guide for teachers, 6-12. Portsmouth, N.H.: Heinemann.

Daniels, H., & Zemelman, S. (2004). Subjects matter: Every teacher's guide to content-area reading. Portsmouth, N.H.: Heinemann.

Harvey, S., & Goudvis, A. (2000). Strategies that work: Teaching comprehension to enhance understanding. York, Me.: Stenhouse Publishers.

Tovani, C. (2004). Do I really have to teach reading?: Content comprehension, grades 6-12. Portland, Me.: Stenhouse Publishers.

Various techniques and mechanisms of the present invention will sometimes be described in singular form for clarity. However, it should be noted that some embodiments include multiple iterations of a technique or multiple mechanisms unless noted otherwise. For example, a system may utilize a network. However, it will be appreciated that a system can use multiple networks while remaining within the scope of the present invention unless otherwise noted.

Similarly, various steps of the methods shown and described herein are not necessarily performed in the order indicated, or performed at all in certain embodiments. Accordingly, some implementations of the methods discussed herein may include more or fewer steps than those shown or described.

Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. For example, several entities are described as connected by, or communicating through, various networks, but it will be appreciated that a variety of computer networks, phone lines, satellite communications, wireless networks and the like may exist between the entities shown. Consequently, an indicated connection does not necessarily mean a direct, unimpeded connection unless otherwise noted. For instance, the terms "communicating with," "in electronic communication with," and the like mean being in data communication with, regardless of intervening devices or processing.

With reference to FIG. 1, shown is a diagram showing example aspects of an example interactive learning system and method 1000 according to one example embodiment. This example system 1000 may comprise one or more teachers 10 having access to one or more teacher computing devices 20. The one or more teacher computing devices 20 may comprise any suitable digital device comprising one or more processor units, one or more programmable memory units, data storage medium, one or more input ports, one or more output ports, and circuitry connecting to a network 70. Non-limiting examples of suitable teacher computing devices 20 may include desktop computers, laptop computers, terminals in data communication with servers or other computers, handheld and mobile devices such as smart phones and PDAs, tablets, or any other suitable digital device capable of communicating information to a user such as a teacher 10 and receiving information from a user such as a teacher 10 and transmitting that information to a network 70.

With continuing reference to FIG. 1, an example system 1000 may further comprise a plurality of students 30 having access to one or more student computing devices 40. The one or more student computing devices 40 may comprise any suitable digital device comprising one or more processor units, one or more programmable memory units, data storage medium, one or more input ports, one or more output ports, and circuitry connecting to a network 70. Non-limiting examples of suitable student computing devices 20 may include desktop computers, laptop computers, terminals in data communication with servers or other computers, handheld and mobile devices such as smart phones and PDAs, tablets, or any other suitable digital device capable of receiving from a network 70 and communicating to a user such as a student 30 written, audio, image, video, or other information in a time-released manner, for instance at a predetermined rate, and receiving information input from a user such as a student 30, associating that information input with one or more segments of a digital file such as a text or document 60, and transmitting that information and its association to a network 70. User inputs may be any combination of suitable inputs, such as keyboard keystrokes, mouse movements or clicks, physically touching or interacting with an interactive screen, voice recognition, or any other communicative input.

As indicated in FIG. 1, an example system 1000 may further comprise one or more databases 50 in data communication with the network 70. The one or more databases can be remotely or locally located in whole or in part in one or more servers, may be hosted in whole or in part on the Internet in what is commonly referred to as the "cloud," may be located in whole or in part on the one or more teacher computing devices 20, and may be located or distributed among the one or more student computing devices 40. Any suitable database(s) 50 capable of performing the functionality described herein may be used as will be apparent to persons of skill in the art.

Text or document 60 as shown in FIG. 1 may comprise a digital file, copies of which are viewed, listened to, or otherwise perceived by the plurality of students 30 with their respective student computing device(s) 40. Text or document 60 may be considered to be divisible into successive segments to facilitate time-wise delivery of successive segments to the perception of the student 30, for instance at a predetermined or adjustable rate, and to allow inputs from the student 30 to be associated with the segment(s) of the text or document 60 being displayed, highlighted, or considered at the time of the input. Data comprising inputs from the students 30 regarding various segments of each of their copies of the text or document 60 may be communicated in real-time through one or more networks 70 to the one or more teacher computing devices 20, and may also simultaneously or later be communicated to the one or more databases 50 and compiled and associated with corresponding segments of a reference copy of the text or document 60 residing on or in communication with the one or more databases 50. One or more teachers 10 may be able to use their teacher computing devices 20 to access copies of documents or texts 60 and associate input request with various segments thereof, as described for instance in general in the Summary section herein, so that when students 30 view the documents or texts 60 on their computing devices 40 the input requests appear automatically when they reach the segment(s) associated with the input requests. For purposes of this disclosure a segment of a text or document 60, which can be any digital file, may comprise any subset of that file, such as a chapter, paragraph, word, letter, space, punctuation mark, image, byte or bit.

The network 70 referred to in FIG. 1 may be any suitable network capable of performing the functions indicated herein, and may be wireless in whole or in part, wired in whole or in part, may comprise any or all of a Local Area Network (LAN), Wide Area Network (WAN), intranet, the Internet, Ethernet, telephone networks, satellite networks, cable systems, or any other suitable structures capable of communicating digital signals as will be apparent to persons of skill in the art.

An example of information flow in the example embodiment shown in FIG. 1 will now be described. In one example embodiment a student 30 may have an interaction while reading a specific text or document 60, for instance they may receive an input request and satisfy that input request by providing an input, such as an answer to a question. This interaction may be indicated and visually associated directly with the corresponding text visible in the Student's Screen View, indicated as (A). In various example embodiments the interaction may then travel in real time to one or more places, such as the teacher computing device(s) 20 and the one or more databases 50. In the instance that the interaction is sent to the teacher computing device(s) 20 as indicated at (B), any interaction from any student 30 may be viewable in real time by the teacher 10 using a Teacher Screen mode on the teacher computing device 20. The interaction may also be transmitted as indicated by (C) and recorded in the database for use by the teacher 10 for assessment or for planning during subsequent years, for instance. The database 50 may also record and/or store all interactions by each student 30 across all the student's classes, grading periods, school years, and the like. Teachers 10 may also have the ability to embed questions, tasks, hyperlinks to extension activities, interaction prompts, grammar errors, vocabulary, and the like directly into a text or document 60 by associating the same with one or more segments of the text or document 60, as indicated by (D). In certain embodiments this may be done in real time while students 30 are reviewing the text or document 60, for instance in response to real-time feedback (B). The resulting output associated with the text or document 60 may be visible to all students 30 (or specific students 30, for instance if the teacher 10 is accommodating instruction for students 30 with special needs, ESL, etc.). The teacher 10 may also respond in real-time to interactions from students 30 either to a particular student individually as indicated by (E), or the teacher can respond to the entire group or class as indicated by (F). Again, these responses may be logged into the database 50 for future reference. For purposes of planning, the teacher 10 may be able to access the database 50 directly and upload (G) any or all previous interactions, teacher-embedded questions, extension activities from a previous class or school year, for instance. The teacher 10 can use this information to guide teaching in subsequent years, and the teacher can save or download (H) lesson plans that can continue to be built upon each year, by associating the downloaded information with the reference copy of the text or document 60 residing on the database 50.

Figure 2:
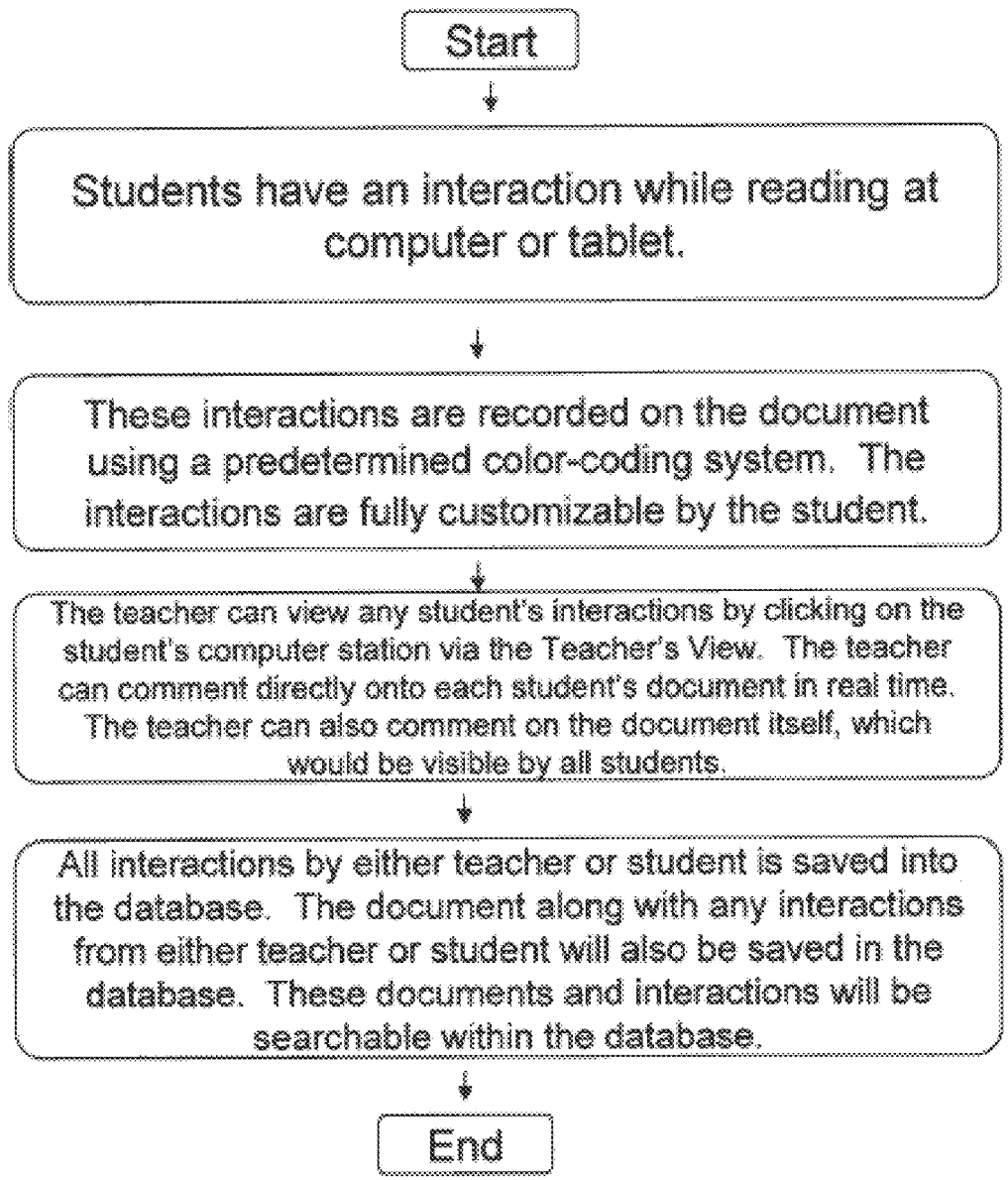
FIG. 2 is a flow chart showing certain example steps that may be associated with an example interactive learning system and method according to one example embodiment.

Example functions of an example system and method are described in FIG. 2. Students 30 may have an interaction while reading at computer or tablet 40. These interactions are recorded on or otherwise associated with the document 60, for instance using a predetermined color-coding system. The interactions may be fully customizable by the student 30. The teacher 10 can view any students interactions by clicking on a link corresponding to the student's computer station, for instance via a Teacher's View interface on the teacher's computing device 20. The teacher 10 can comment directly onto each student's copy of the document 60 in real time. The teacher 10 can also comment on a reference copy of the document 60, which would be visible to all students 30. All interactions by either teacher 10 or student 30 may be saved into the one or more databases 50. The document 60 along with any interactions from either teacher 10 or student 30 may also be saved in the one or more databases 50. These documents 60 including their associated interactions may be word searchable within the database.

Figure 3:
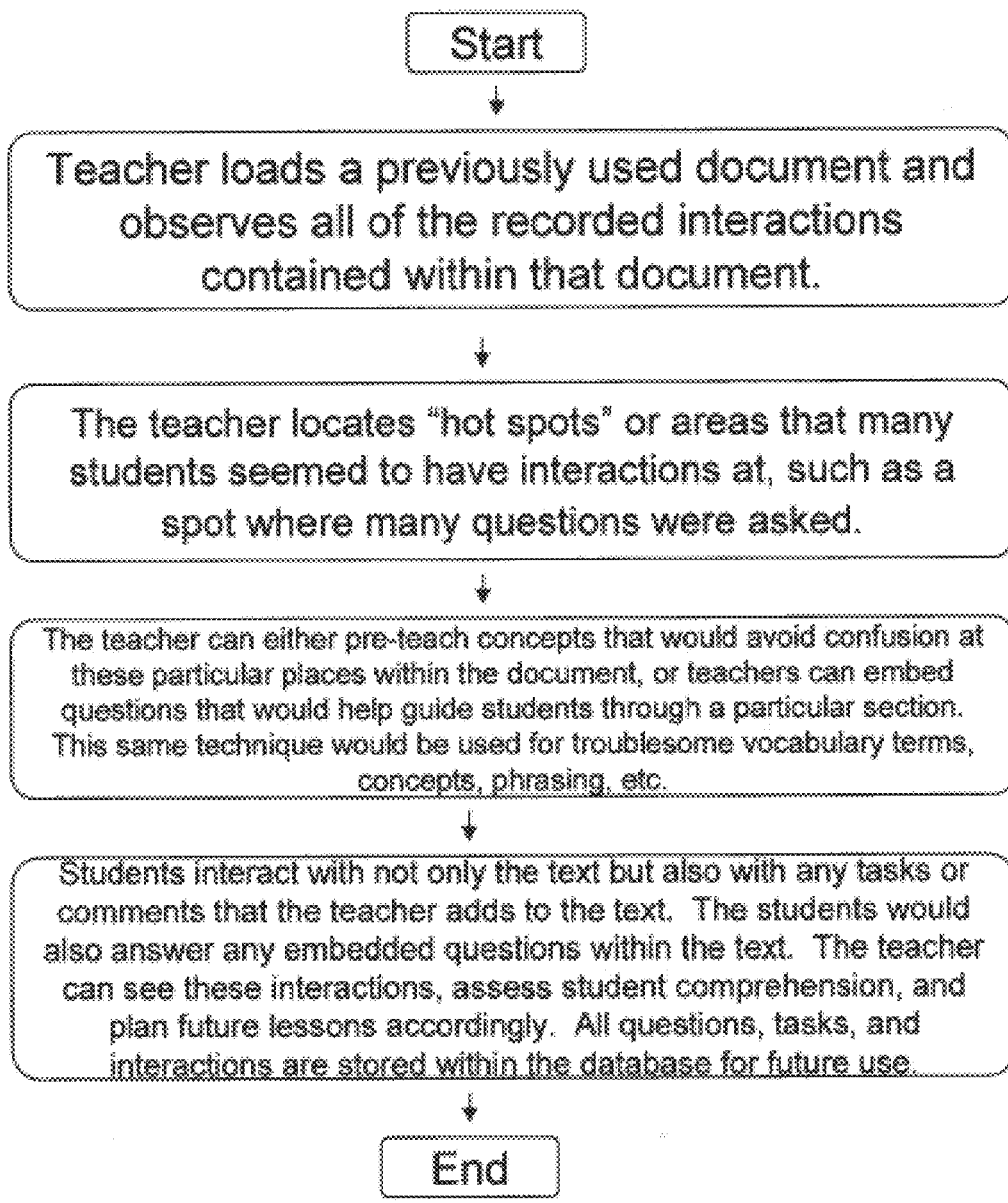
FIG. 3 is a flow chart showing certain example steps that may be associated with an example interactive learning system and method according to one example embodiment.

FIG. 3 describes examples of a teacher 10 planning with the use of one or more databases 50. A teacher 10 may upload a previously-used text or document 60 from the one or more databases 50 and observe all of the recorded interactions contained within or associated with that text or document 60. The teacher 10 may locate so-called "hot spots" or areas where many students 30 seemed to have interactions, such as a segment or spot where many questions were asked. The teacher 10 can either pre-teach concepts that would avoid confusion at these particular places or segments within the text or document 60 or one or more teachers 10 can embed questions or comments or other information into the text or document 60 that would help guide students 30 through a particular section. This same technique could be used for troublesome vocabulary terms, concepts, phrasing, and the like.

Students 30 may interact not only with the text or document 60 but also with any tasks or comments that the teacher 10 adds to the text or document 60. The students 30 would also answer any embedded questions within the text or document 60. The teacher 10 can see these interactions, assess comprehension of the students 30, and plan future lessons accordingly. All questions, tasks, and interactions may be stored within the one or more databases 50 for future use.

Figure 4:
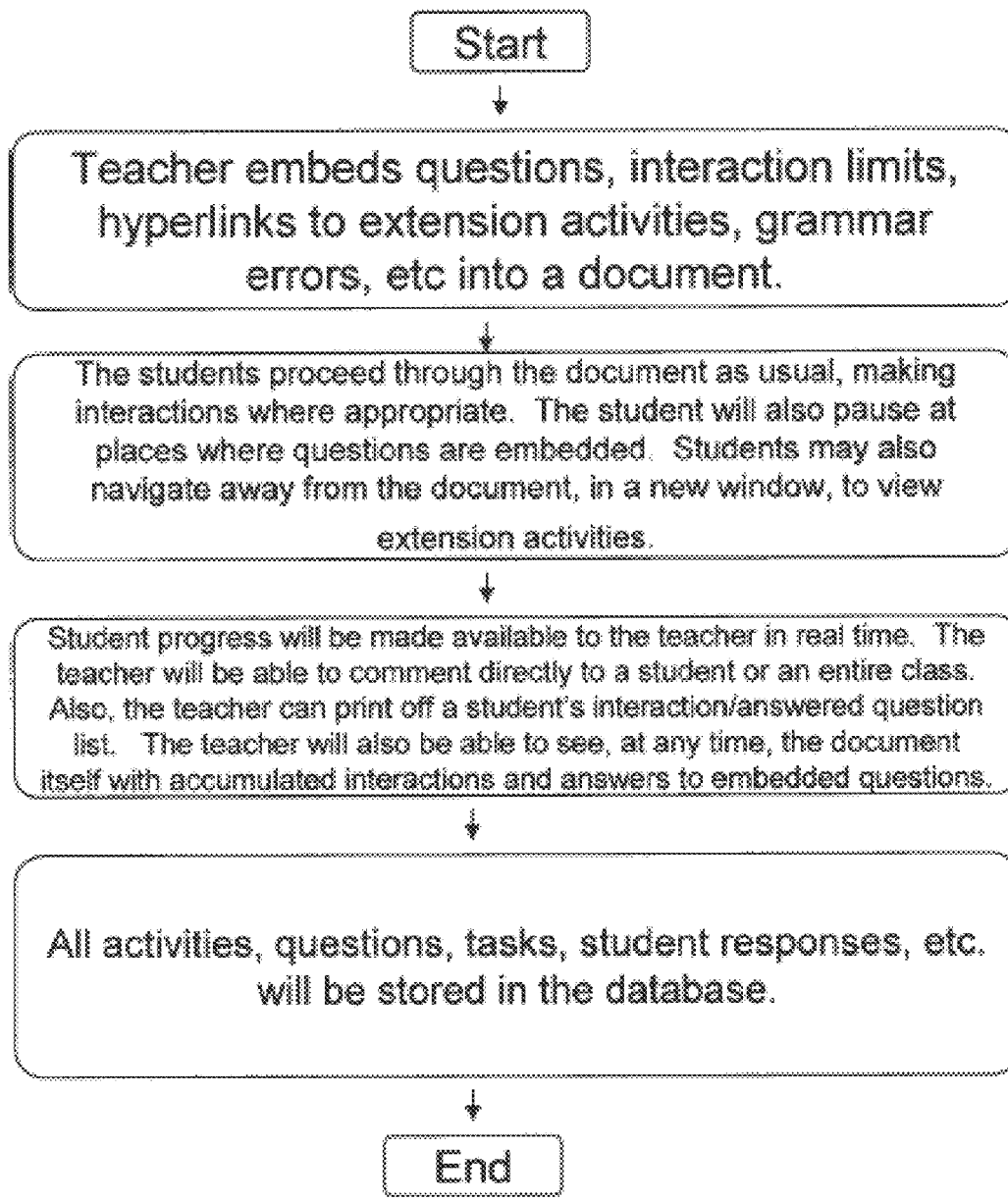
FIG. 4 is a flow chart showing certain example steps that may be associated with an example interactive learning system and method according to one example embodiment.

With reference to FIG. 4, a teacher 10 may embed questions, interaction limits, hyperlinks to extension activities, grammar errors, and the like into a text or document 60 by associating them with segments of the text or document 60. The students 30 proceed through the text or document 60 as usual, making interactions, i.e., providing inputs, where appropriate. The students 30 may also pause at places or segments of the text or document 60 where questions are embedded. In certain example embodiments students 30 may navigate away from the text or document 60, for instance into a new window, to view extension activities.

Information showing progress of students 30 may be made available to the teacher 10 in real time. The teacher 10 may be able to comment directly to a student 30 or an entire class of students 30. Also, the teacher 10 can in various embodiments print, email, save, or otherwise record one or more student's interactions, such as an answered question list. The teacher 10 can in certain embodiments see, at any time including in real-time, the text or document 60 itself with interactions and answers to embedded questions accumulated by any or all of the students 30.

Figure 5A:
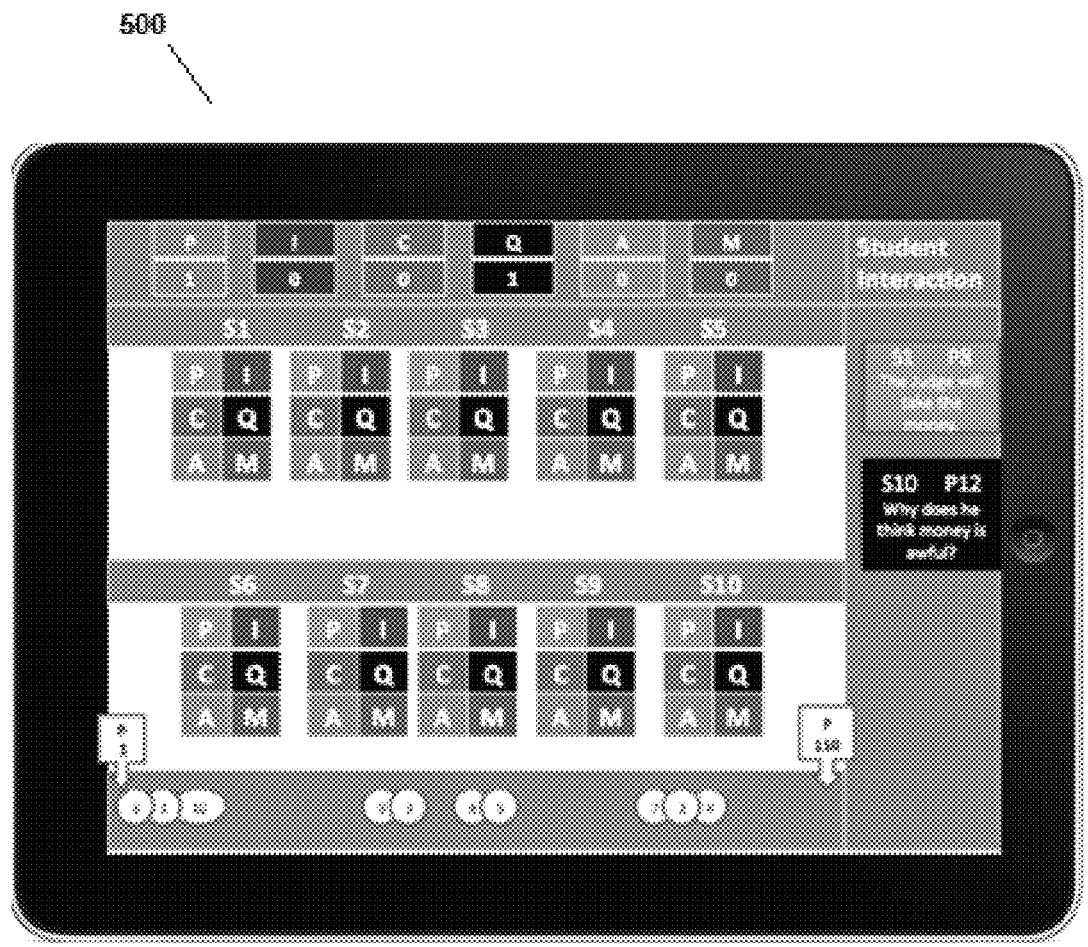
FIG. 5A is a diagram of an example teacher dashboard that may be used with an example interactive learning system and method according to one example embodiment.

FIG. 5A depicts an example Teacher View Screen or Dashboard 500 that a teacher 10 might view and interact with on a teacher computing device 20. However, any suitable interface having any suitable configuration and displaying any suitable information may be used. In various example embodiments the categories shown may be fully customizable. In this particular example the matrices S1 through S10 correspond to ten individual students 30. For each student 30, six types of interactions are shown, where "P" stands for prediction, "I" stands for inferences, "C" stands for comment (or connections), "Q" stands for question, "A" stands for answer, and "M" stands for media (related videos, hyperlinks, etc.). At the top of the screen 500 a running total sum for the class of each interaction type is shown (i.e., one prediction and one question). Clicking or selecting any of those squares in the top row may cause a hyperlink to bring up the content of all the interactions in that category for the teacher to review, along with the corresponding student identifier and the page or segment that was being reviewed at the time of each interaction. A running scroll displaying at least a portion of the content of the interactions is shown on the right side of the screen 500, where the one prediction input is that "[t]he Judge will take the money[,]" and the screen 500 indicates that this prediction input was made by student S1 while he or she was reviewing the text 60 at page 8. Shown immediately below that one prediction is the one question, which is "[w]hy does he think money is awful?" The one question is indicated to have been input by student S10 while on page 12 of the text 60. At the bottom of the screen 500 appears a timeline of sorts extending from P1 to P150, indicating pages 1 through 150 of the text 60. The timeline indicates at a glance how many total interactions students 30 had in the past at the various pages 1 through 150, so the teacher 10 can anticipate where the present class is likely to have interactions. Alternatively, a histogram or other visual charting technique may be used to show locations and frequencies of interactions.

Figure 5B:
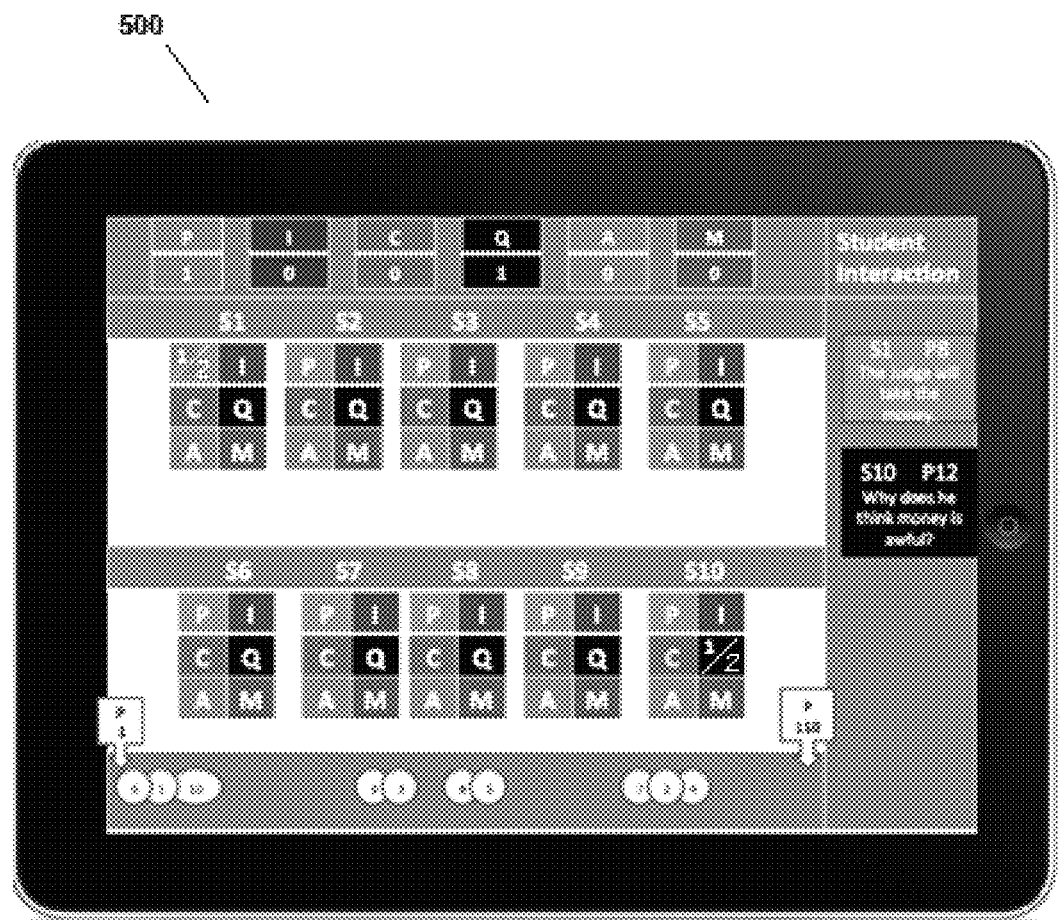
FIG. 5B is a diagram of another example teacher dashboard that may be used with an example interactive learning system and method according to one example embodiment.

In an alternative embodiment 500' shown in FIG. 5B, each of the six squares in the rectangular matrix (P, I, C, Q, A, M) for each student S1 through S10 may include a number indicating the number of corresponding interactions of each type engaged in by each student. Additionally, where the teacher 10 has preselected a certain number of required interactions of certain types for certain students, those certain numbers may also appear in the corresponding ones of the six squares, for instance as a denominator of a fraction. For example, for student S1, instead of or in addition to the letter P appearing in the top left box under S1, the number ½ could appear, indicating that he or she has made one prediction so far, out of two that will be required for this text 60. Likewise, for student S10, instead of or in addition to the letter Q appearing in the middle right box under S10, the number ½ could appear, indicating that he or she has asked one question so far, out of two that will be required for this text 60. When a student has an interaction, the student's matrix or "station screen" may change or flash a color, for instance one predetermined by the teacher. It will be apparent to those of skill in the art that any appropriate numbers may be used, and that any number of boxes or other fields may be used for each student. In this embodiment 500', at a glance the teacher 10 could be provided a visual indication of how all students S1 through S10 are progressing in all their pre-assigned interaction types.

Further, each of the six squares in the rectangular matrix (e.g., P, I, C, Q, A, M) for each student S1 through S10 may comprise a hyperlink to the content of that student's corresponding interactions in each of those categories, and that or another area may also comprise a hyperlink to view the student's screen in real-time.

Turning to FIG. 6, depicted is an example Student Screen view that a student 30 might see while using a student computing device 40. The scrolling highlighting of text reaches word "metaphor," and the student hits a key such as the spacebar or take some other action to cause the scrolling highlighting of text to stop. The student 30 then clicks on the "question" button or link which pops up a window into which the student 30 types or otherwise enters the quest of what a metaphor is. This interaction or input is communicated in real time from the student computing device 40 through the network 70 to the teacher computing device 20, where the teacher 10 can see this question and can send an answer back through the system to the student 30 in real-time. The same mechanism can be used in connection with any of the other input or interaction types, such as Question, Inference, Prediction, Comment, and the like, as shown in FIG. 6. Also, the list of interaction types may change as the student 30 progresses through the text 60, as appropriate. For instance, a link named "Foreshadowing" may appear at a relevant portion of the text 60, where the student 30 may stop or be forced by the system 1000 to stop and provide an input regarding that topic. Pop-up test questions may be provided in the same manner. Additionally, when a question is answered, a new pop-up may appear requesting or requiring a follow-up answer, such as "why do you think that?" The teacher 10 may have the authority to associate new or different questions or information or categories of interactions with any segments of the text 60, for instance by numbered paragraphs. The system 1000 may be standardized or completely customizable by the teacher 10, so that information and questions of any type may occur anywhere in the text 60. All of the interactions and inputs may be communicated through the network 70 to the one or more databases 50. In a self-contained example (not shown) where the teacher 10 and student 30 are working on the same physical machine at the same time no network 70 may be necessary; otherwise the term network 70 is to be interpreted broadly.

Non-limiting example aspects of various suitable software implementations for example systems 1000 will now be described. A cloud-based service may be used that stores digital versions of reading material 60 and software to support teachers 10 and students 30 using the reading material 60. The provider of the system 1000, teachers 10, and other authorized people can add reading material 60 to this system 1000 and enter indexing information such as title and author. The system 1000 may be password protected and secured in other ways for purposes including minimizing access by non-authorized entities.

The provider of the system 1000 may provide access to the software to a school or teachers 10 and will configure the software options as needed. School administrators and teachers 10, and students 30 may access the system 1000 using Internet browsers, tablet apps, and other similar software. Setup may include various configuration settings such as whether each student 30 will use specific hardware 40 assigned to them and if so does the school want the software to remember which hardware 40 is associated with each student 30. The school will then provide the software with a list of teachers 10 including the teachers log-in information. Optionally, schools can upload class lists (lists of students 30) into the system 1000 and assign them to teachers 10.

Teachers 10 will typically log in to use the system 1000. For example, teachers may either enter class lists for each class or verify that the school has uploaded information for each class. This involves not only the students' 30 names, but may include grade level of the class, discipline, type of class (e.g., gifted or special education), starting and ending date for the class, and other descriptive fields. Teachers 10 would also typically assign passwords for the students 30 in the class.

Once logged-in, teachers 10 may search for and select from currently available reading material 60. The search may include, for example, author, previous teacher evaluation and the other information.

When a teacher 10 decides to use particular reading material 60 with a particular class of students 30, he or she may check to see if particular phrases in the text 60 have been previously selected to be shared by other teachers 10 and for what purposes. Teachers 10 can choose to allow students 30 to see these marked phrases or segments of the text 60. The teacher 10 may identify his or her own phrases in the text 60 and indicate that students 30 can see which phrases have been marked. Teachers 10 may also indicate that these phrases and their purposes can be shared with other teachers 10. Teachers 10 may also set which reading strategies students 30 should use, either individually, and/or as a group.

Students 30 may log in to the system 1000 via their student computing devices 40 using, for example, their name and initially, a blank password. Students 30 may for example then change their password. Computer systems 1000 may remember students using techniques known in the art. If any problems occur, a teacher 10 may log in and give the student 30 access to a special log-in screen to re-enter passwords. In certain example embodiments, students 30 who are logged in can see a list of their classes that are setup by the school or teacher 10 and the reading materials 60 associated with each class. To access a class's reading material 60, the student 30 may enter the class password, for instance.

In one example embodiment, students 30 can access reading materials 60 for their classes as long as the teacher 10 assigned dates and that day's date are consistent. The student's 30 interface allows them to access the reading material 60 (auditory or visual). The software may track where each student 30 is in a reading assignment, i.e., within the reading material 60. There may be multiple interfaces for the students 30. For example, one interface may display reading material 60 from which students 30 can select a passage, select a reading strategy, and leave a note, comment, or question. Another interface may allow students 30 to review the passages they have marked along with notes they entered and a comment box in which they can leave an explanation or other comment. All of the foregoing are just examples of possibilities.

When students 30 are reading and interacting with the system 1000, teachers 10 may have interfaces that provide them with real-time information including where students 30 are in the reading assignment materials 60 as well as details of their selected passages, student notes, comments, and the like. Teachers 10 may contact students 30, ask them questions or make comments, all through the system 1000. Teachers 10 may also have interfaces that allow them to get detailed historical information for the class and individual students 30.

When teachers 10 are done with a reading assignment, they may be encouraged to leave evaluation information and other information that may be of use to other teachers 10 as well as others, such as the provider of the system 1000.

Information stored in the database 50 may be archived and used for various purposes. Analysis of the data in the database 50 using business intelligence approaches and various statistical procedures may be used to provide information to new teachers 10 that can help them select and teach appropriate reading materials 60 for their students 30, for instance. The term digital content 60 is intended to be broadly interpreted and include the various types of documents, texts, reading materials, and other digital content 60 described herein.

Any of the suitable technologies set forth and incorporated herein may be used to implement various example aspects of the invention as would be apparent to one of skill in the art.

Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

What is claimed is:

1. An electronic interactive learning system comprising:
a plurality of student computing devices comprising one or more processor units, one or more programmable memory units, data storage medium, one or more input ports, one or more output ports, and circuitry connecting to a network;
one or more teacher computing devices comprising one or more processor units, one or more programmable memory units, data storage medium, one or more input ports, one or more output ports, and circuitry connecting to the network;
one or more databases in electronic communication with the plurality of student computing devices through the network and in electronic communication with the one or more teacher computing devices through the network, the one or more databases containing digital content for student review, the digital content comprising a plurality of segments;
each of the plurality of student computing devices adapted to:
  access the digital content and present the plurality of segments to a unique student at a predetermined pace;
  receive input from the unique student regarding one or more of the plurality of segments of the digital content;
  associate said input with said one or more of the plurality of the segments corresponding to said input; and
  communicate in real-time to the one or more teacher computing devices said input from the unique student and its association with said digital content;
each of the one or more teacher computing devices adapted to:
  access and present to one or more teachers in real-time information identifying said input and the unique student with which said input is associated; and access a plurality of said inputs from a plurality of said unique students and simultaneously present in real-time to the one or more teachers hyperlinks to said plurality of said inputs and information indicating the number of said inputs inputted by each of said unique students;

said one or more databases adapted to:
update said digital content with said input from the unique student and its association with said digital content.

2. The electronic interactive learning system of claim 1, wherein said input from the unique student is selected from categories associated with at least one of said segments, said categories preselected by the one or more teachers.

3. The electronic interactive learning system of claim 2, wherein said categories are selected from at least one member of the group consisting of: predictions, inferences, connections, questions.

4. The electronic interactive learning system of claim 2, wherein said one or more teacher computing devices are adapted to access a plurality of said inputs from a plurality of said unique students and simultaneously present in real-time to the one or more teachers hyperlinks to said plurality of said inputs and information indicating the number of said inputs inputted by each of said unique students in each of said categories.

5. The electronic interactive learning system of claim 4, wherein said one or more teacher computing devices are further adapted to simultaneously present in real-time to the one or more teachers information indicating how many of each of said inputs are desired to be completed for each of said categories for each of said unique students.

6. The electronic interactive learning system of claim 1, wherein each of the plurality of student computing devices is further adapted to:
present to the unique student one or more questions corresponding to one or more of the plurality of segments, wherein the one or more questions are generated by the one or more teachers; and
wherein said input from the unique student comprises one or more answers to the one or more questions.

7. The electronic interactive learning system of claim 6, wherein each of the plurality of student computing devices is further adapted to:
present to the unique student one or more follow-up questions after the unique student inputs the one or more answers to the one or more questions; and
wherein said input from the unique student comprises one or more answers to the one or more follow-up questions.

8. The electronic interactive learning system of claim 1, wherein said one or more teacher computing devices are adapted to access a plurality of said inputs from a plurality of said unique students and simultaneously present in real-time to the one or more teachers at least a portion of the contents of said plurality of said inputs and information identifying each unique student corresponding to each of said plurality of said inputs.

9. The electronic interactive learning system of claim 1, wherein said one or more teacher computing devices are adapted to access a plurality of said inputs from a plurality of said unique students and simultaneously present in real-time to the one or more teachers information indicating a total number of said inputs inputted regarding each of said plurality of segments.

10. The electronic interactive learning system of claim 1, wherein each of the plurality of student computing devices is further adapted to:
stop presenting additional segments to the unique student until the student computing device receives one or more inputs regarding one or more of the segments presented to the unique student.

11. The electronic interactive learning system of claim 1, wherein each of the plurality of student computing devices is further adapted to:
stop presenting additional segments to the unique student while the student computing device receives the input.

12. The electronic interactive learning system of claim 1, wherein said one or more teacher computing devices are adapted to access a history of said inputs from any one of said unique students and present to the one or more teachers information regarding said history of inputs, said information comprising the content of said history of said inputs.

13. The electronic interactive learning system of claim 1, wherein a first one of said one or more teacher computing devices is adapted, to access from a second one of said one or more teacher computing devices a history of said inputs from a plurality of said unique students.

14. A method of interactive learning, comprising the steps of:
using a plurality of student computing devices to provide an interface to:
access digital content comprising a plurality of segments and present the plurality of segments of the digital content to a unique student at a predetermined pace;
receive inputs from the plurality of unique students regarding one or more of the plurality of segments of the digital content, wherein at least one of said inputs from at least one of said unique students is selected from categories associated with at least one of said segments, said categories preselected by the one or more teachers;
associate said inputs with said one or more of the plurality of the segments corresponding to said inputs; and
communicate in real-time to one or more teacher computing devices said inputs and their corresponding associations with said digital content;
using one or more teacher computing devices to provide an interface to:
access and present to one or more teachers in real-time information identifying said inputs and each unique student with which each of said inputs is associated; and
access a plurality of said inputs from a plurality of said unique students and simultaneously present in real-time to the one or more teachers hyperlinks to said plurality of said inputs and information indicating the number of said inputs inputted by each of said unique students in each of said categories; and
causing one or more database to:
update said digital content with said inputs and their corresponding associations with said digital content;
wherein the plurality of student computing devices comprises on or more processor units, one or more programmable memory units, data storage medium, one or more input ports, one or more output ports, and circuitry connecting to a network;
wherein the one or more teacher computing devices comprises one or more processor units, one or more programmable memory units, data storage medium, one or more input ports, one or more output ports, and circuitry connecting to the network; and wherein the one or more databases are in electronic communication with the plurality of student computing devices through the network and in electronic communication with the one or more teacher computing devices through the network, and the one or more databases contain the digital content.

15. The method of interactive learning of claim 14, further comprising the step of:

communicating, new information to the plurality of unique students based on the inputs.

16. The method of interactive learning of claim 14, further comprising the step of:

communicating new information to one of the unique students based on one or more inputs received from that student.

17. The method of interactive learning of claim 14, further comprising the step of communicating one or more new questions to the plurality of unique students based on the inputs.

18. The method of interactive learning of claim 14, further comprising the step of:

communicating one or more new questions to one of the unique students based on one or more inputs received from that student.

19. The method of interactive learning of claim 14, further comprising the step of:

accessing the updated digital content on the database and evaluating the performance of one or more of the one or more teachers based on the updated digital content.

* * * * *